United States Patent
Allgood et al.

[11] Patent Number: 5,920,266
[45] Date of Patent: Jul. 6, 1999

[54] AUTOMATIC TERMINATION FOR COMPUTER NETWORKS

[75] Inventors: Robert D. Allgood, Riverdale; Glenn B. Dixon, Roy, both of Utah

[73] Assignee: Iomega Corporation, Roy, Utah

[21] Appl. No.: 08/239,999

[22] Filed: May 9, 1994

Related U.S. Application Data

[63] Continuation-in-part of application No. 07/741,552, Aug. 7, 1991, abandoned.

[51] Int. Cl.[6] .................................................. H04Q 3/00
[52] U.S. Cl. ...................... 340/825.05; 326/30; 395/306
[58] Field of Search ........................ 340/825.05, 825.06, 340/825.52, 825.53, 825.57; 370/85.1, 85.11, 85.12, 85.3, 85.7, 85.2; 375/36; 324/418; 326/30, 86, 90; 395/306

[56] References Cited

U.S. PATENT DOCUMENTS

| | | | |
|---|---|---|---|
| 4,674,085 | 6/1987 | Aranguren et al. | 370/85.2 |
| 4,713,827 | 12/1987 | Lauffer et al. | 375/36 |
| 4,723,120 | 2/1988 | Peety, Jr. | 340/825.52 |
| 4,914,625 | 4/1990 | Billian | 340/825.05 |
| 4,920,339 | 4/1990 | Friend et al. | 340/825.52 |
| 5,029,284 | 7/1991 | Feldbaumer et al. | 326/30 |
| 5,313,595 | 5/1994 | Lewis et al. | 395/325 |
| 5,434,516 | 7/1995 | Kosco | 326/30 |

*Primary Examiner*—Michael Horabik
*Assistant Examiner*—Edward Merz
*Attorney, Agent, or Firm*—Woodcock Washburn Kurtz Mackiewicz & Norris LLP

[57] ABSTRACT

A link detection circuit automatically terminates SCSI data transmission lines by use of a sense circuit which detects the absence or presence of an adjoining device or devices. The lines are automatically terminated at the ends with no user intervention. Wrong input/output cabling is precluded by use of a bi-directional link detection circuit. Detection is done without adding signal lines or disturbing buss functionality.

12 Claims, 6 Drawing Sheets

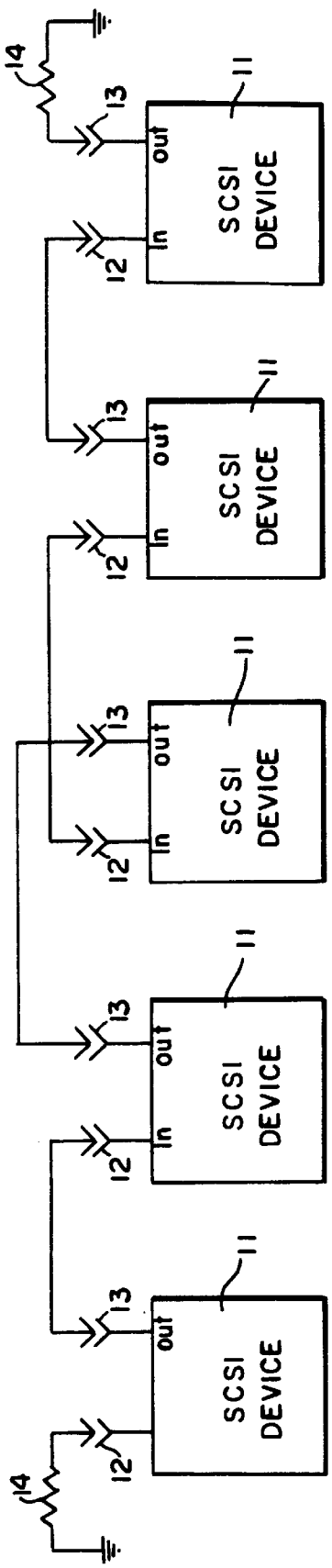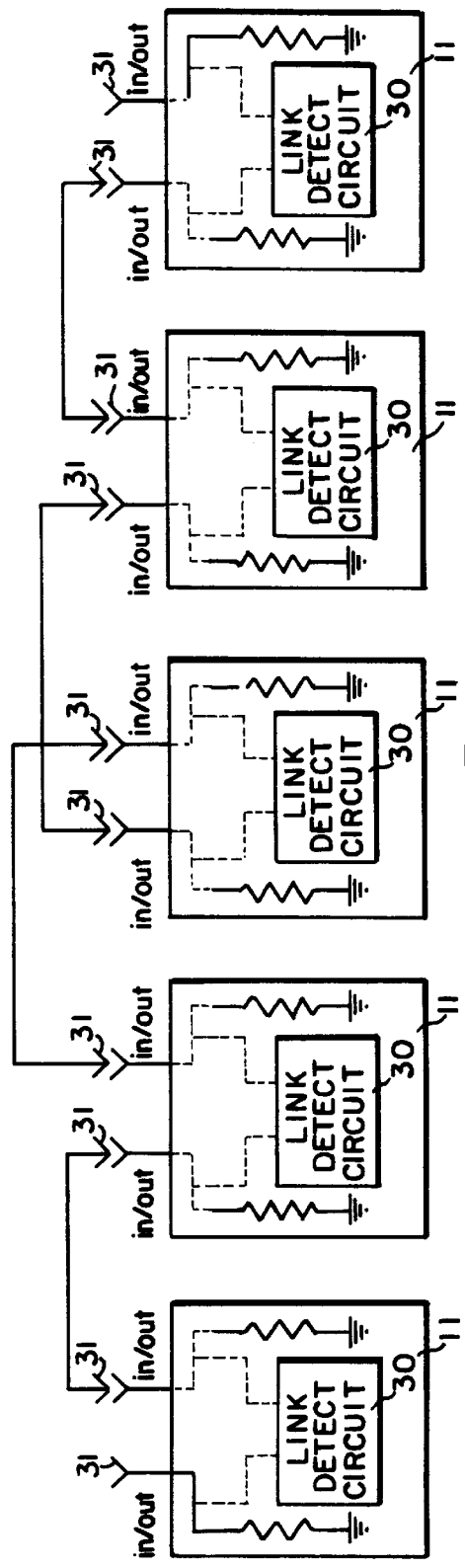

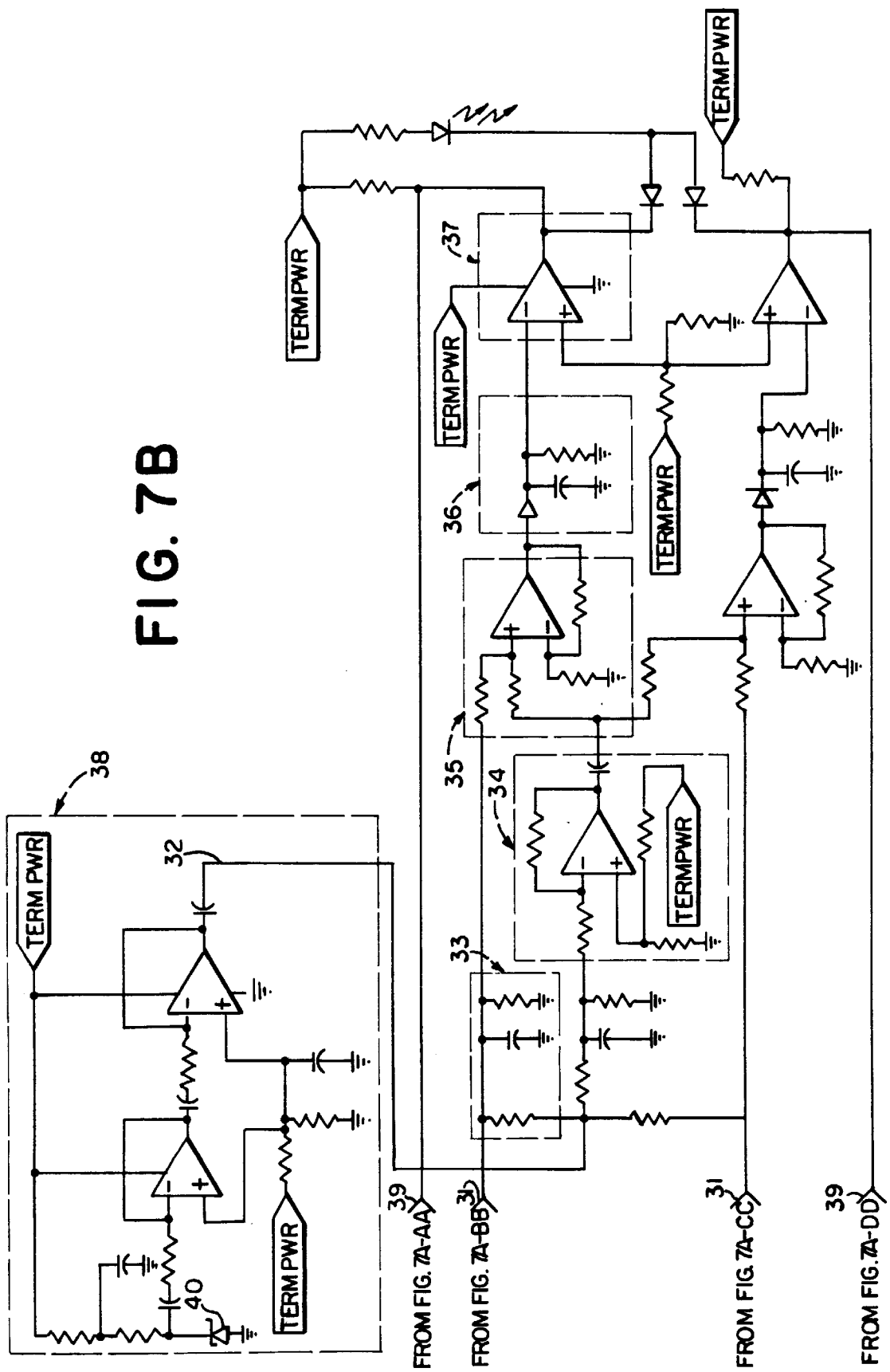

AUTOMATIC TERMINATION FOR COMPUTER NETWORKS

This application is a continuation-in-part of Ser. No. 07/741,552, filed Aug. 7, 1991, entitled "AUTOMATIC TERMINATION FOR COMPUTER NETWORKS", now abandoned.

FIELD OF THE INVENTION

This invention relates to an automatic cable terminator for devices such as computers connected in a network.

BACKGROUND OF THE INVENTION

Personal computers, printers, and disc or tape drives are often connected in daisy chain, star, or other configurations. Normally, each device has two ports and is connected to other devices by cables each of which has a plurality of lines. The devices communicate electronic signals to each other over the lines. The lines should be terminated with a termination device (typically resistors) at the first and last device in the chain. The resistors are selected according to the characteristic impedance of the lines. Each signal line and its corresponding return path (source of potential or ground) form a transmission path, typically in a single twisted pair wire. The terminating impedance is coupled between the lines across the signal path. The resistors must be provided within each device or added externally at both ends of the chain.

Specifically, the SCSI (Small Computer System Interface) bus is an ANSI standard bus designed for high speed data interchange between small computer systems and peripheral devices, such as disk drives and printers. The hardware definition of the bus specifies a multiple transmission line cable that can daisy-chain up to eight devices, and which must be terminated in its characteristic impedance at each end.

The SCSI bus cable (which may consist of multiple cables daisy-chained together between devices) must be terminated in its characteristic impedance at each end and nowhere else. Not terminating the cable can result in excessive signal ringing on the cable, and terminating at places other than the ends of the cable can result in excessive loading to the cable driving circuits. Both types of improper termination may result in data loss and customer perceived reliability problems. Currently, it is the customer's responsibility to manually assure that the bus is properly terminated. As the SCSI bus becomes more popular, more customers are having difficulty doing this properly.

Numerous techniques are generally available for non-SCSI buss devices to determine when it is appropriate to terminate their buss, but these techniques are not available to SCSI buss devices. For example, Petty, Jr. (U.S. Pat. No. 4,723,102) describes a method of daisy-chaining multiple RS-232 or V.25 devices, and Billian (U.S. Pat. No. 4,914,625) describes a method of detecting other devices in a daisy chain connection through the use of "bypass in" and "bypass out" dedicated signals.

The difficulty in applying these techniques to SCSI devices is due to the requirement of dedicated signal lines used solely to determine whether there are other devices connected in the daisy chain. In the case of Petty, a sense line is used for this function and in the case of Billian, the "bypass in" and "bypass out" signals are used. No such signals can be used for SCSI devices to detect other devices in the chain because the signals for the SCSI buss are specified already, and no provision is made in the buss specification for dedicated signals to sense termination status or daisy-chained devices.

Consequently, a need exists for SCSI devices to be able to automatically determine the presence of devices connected to their output buss connector without the use of dedicated sense signals.

Aranguren, et al (U.S. Pat. No. 4,674,085) gives a method of mechanically determining the presence of daisy-chained devices on a telephone network by using connectors specifically modified with mechanical switches that detect the presence of a plugged-in cable. Such a method can be used on SCSI-based devices, but cannot detect the condition caused when a user has connected a cable to the sensing device, without connecting a device to the other end of the cable. This condition occurs in situations where portable or disconnectable equipment is connected and disconnected from the SCSI buss on a temporary basis.

Most devices designed for connection to the SCSI buss have an "in" connector and "out" connector, where the "in" connector is designed to be connected to the host computer (possibly through other SCSI devices daisy-chained to the buss) and the "out" connector to serve for extending the daisy chain to further devices. The "in" and "out" connectors are identical, and can be confused by the user, so it is also desirable to assure that any termination sensing system is not dependent upon which of the "in" and "out" connectors is connected to the host computer.

A need, therefore, exists for an electronic means for a SCSI device to detect whether or not the SCSI buss ends at the device, or is continued to another device, so that the buss may be terminated properly. If the end of the buss is detected by the device, it must terminate the buss in its characteristic impedance, through the use of electronically switchable terminators (such as those described by Feldbaumer, et al, U.S. Pat. No. 5,029,284). If further daisy-chained devices are detected, the termination is switched off. This detection should be automatic and insensitive to which SCSI connector is connected to the host computer. This means must do the detection without adding signal lines to the SCSI buss, and without disturbing the function of the signal lines already defined on the buss. It must also be able to function properly with other devices attached to the buss without regard to whether these other devices have similar automatic sensing circuits installed.

SUMMARY OF THE INVENTION

In accordance with the present invention, a detection circuit automatically terminates a connector in a device to be interconnected with other devices in a network. A sense circuit detects whether another device is connected to the connector and a switchable terminator responds to the sense circuit to automatically connect the proper terminating impedance.

The automatic terminator of the invention is a circuit which can be installed in a SCSI standard device that can be placed at the end of the SCSI cable by the customer. The circuit is designed to sense, using one of several methods, whether the device is at the end of the cable. If the circuit senses that the device is at a cable end, it automatically terminates the cable in its characteristic impedance according to the SCSI specification.

In accordance with a further aspect of the invention, a link detection circuit independently determines whether the device has two adjoining devices connected to it or just one. If the device is servicing both connectors then it must be in the middle of the bus, and the terminations are switched out of the circuit. If only one connector is serviced then the device must be on the end of the chain. The un-serviced connector is then terminated, placing the termination at the end of the bus. This bi-directional implementation precludes improper connections and the need for input/output connector labeling.

It also works regardless of whether other devices on the buss are filled with similar circuitry, and functions without adding additional sense lines, or disturbing the function of existing signal and ground lines.

The foregoing and other objects, features and advantages of the invention will be better understood from the following more detailed description and appended claims.

SHORT DESCRIPTION OF THE DRAWINGS

FIG. 1 shows a network of interconnected SCSI devices;

FIG. 5 is a block diagram similar to FIG. 1, but showing the link detect circuit of the present invention in block form;

Figure 7A:
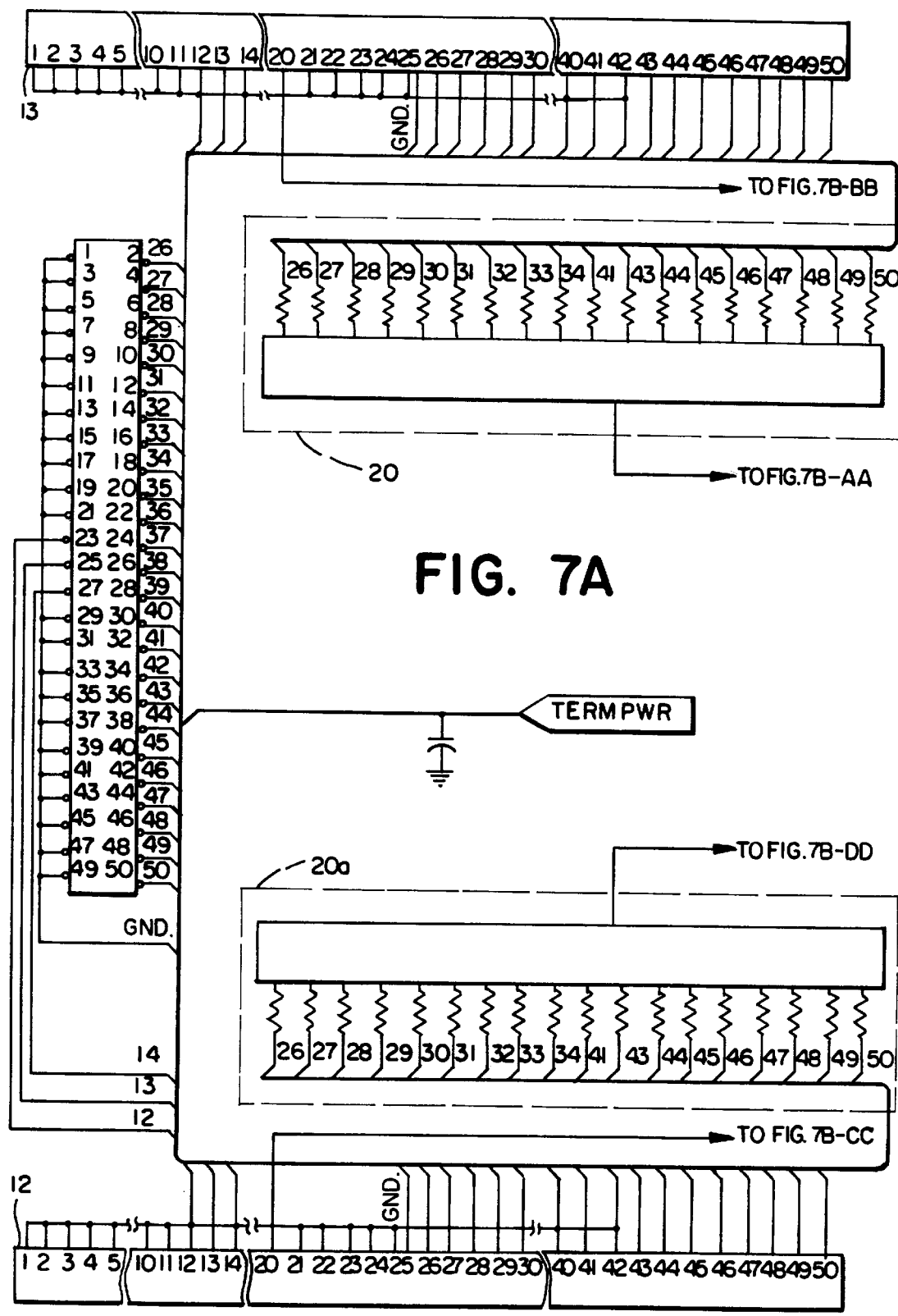

FIGS. 7A–7B together show a circuit diagram of an SCSI auto-termination circuit using the link detection circuit of the present invention.

DESCRIPTION OF THE PREFERRED EMBODIMENTS

FIG. 1 shows a network of interconnected devices 11 which may typically be the devices described in the aforementioned SCSI specification. Each device has an input connector 12 and an output connector 13. The devices are interconnected by cabling in the typical manner. Terminating devices, such as resistors 14, terminate the end devices with the proper characteristic impedance.

Figure 2:
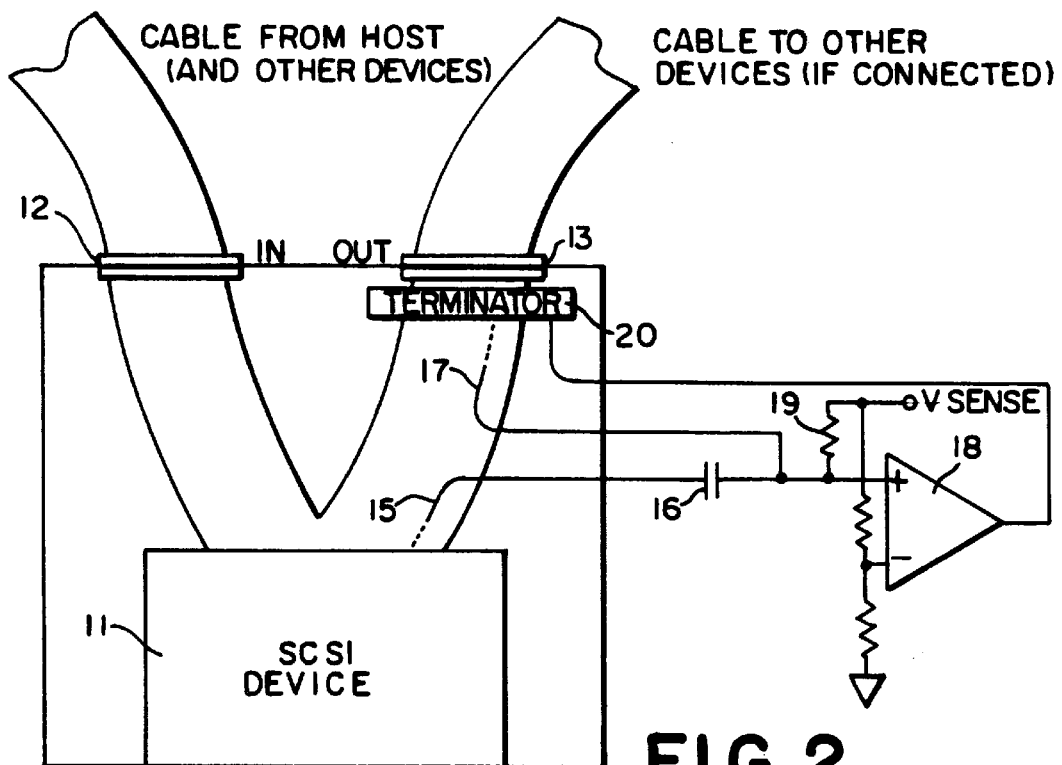
FIG. 2 shows the sense circuit of the present invention.

FIG. 2 shows the sense circuit of the present invention. In this embodiment, the sense circuit is connected to detect the presence of a reference voltage supplied by another device through the connector 13. The ground line 15 is interrupted by capacitor 16, the other side of which is connected to the extension 17 of the ground line. Capacitor 16 couples AC ground currents return to the other device, but blocks a DC voltage. This retains the signal return function of the ground line while allowing it to be used as a sense line.

A comparator includes operational amplifier 18 which detects the presence of ground, or reference, voltage. When another device is connected to connector 13, ground potential is present on the extension 17 of the ground line and at the input to amplifier 18. A resistor 19 connects a sense voltage, $V_{sense}$ to the input of amplifier 18. When no other device is connected to connector 13, the input of amplifier 18 rises to $V_{sense}$. This high voltage at the input acts through amplifier 18 to actuate automatic terminator 20 to automatically connect the proper terminating impedance to connector 13. When another device is present at connector 13, the terminating impedance is disconnected from the circuit.

Figure 3:
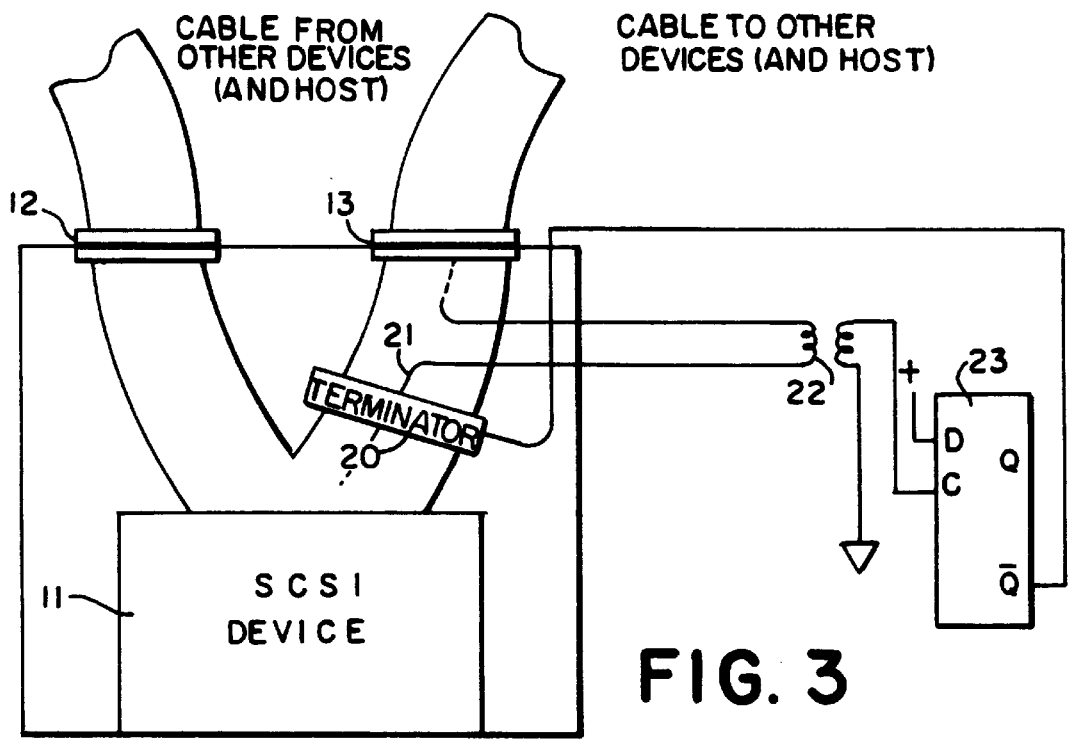
FIG. 3 shows another modification of the sense circuit.

FIG. 3 shows another embodiment wherein the sense circuit is coupled to a control line which carries a pulse of current to the other device when the network becomes active. In this case, the SCSI select line 21 is coupled by current transformer 22 to the latch 23. When a pulse of current is transmitted to another device, the pulse of current acts through current transformer 22 to set the latch 23. When the latch is set, the automatic terminator 20 disconnects the terminating impedance from the connector 13. Latch 23 is reset by a signal which is used to reset the SCSI devices. If the latch 23 remains reset, automatic terminator 20 connects the terminating impedance to the connector 13.

Figure 4:
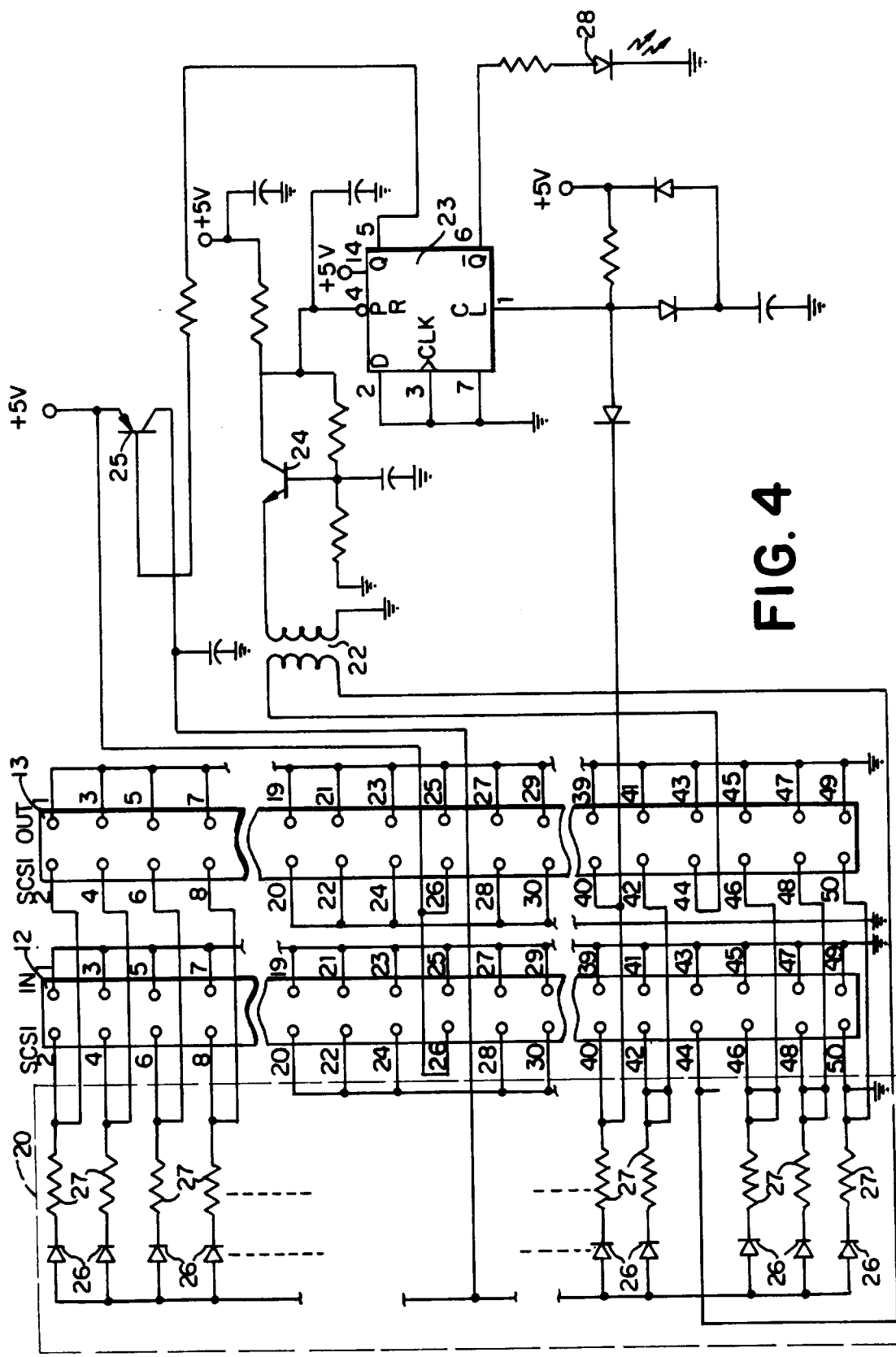
FIG. 4 is a circuit diagram of the sense circuit of an automatic terminator.

FIG. 4 is a circuit diagram of the embodiment of FIG. 3. Current transformer 22 is connected between pin 44 of the SCSI input connector 12 and pin 44 of SCSI output connector 13. The SCSI select line is connected to these connectors. When a select pulse appears on this line, it is coupled through transformer 22. The pulse is amplified in transistor 24, which sets the latch 23. When the latch 23 is set, the current driver 25 is turned off. Current driver 25 is supplied with power from the terminating power line connected to pins 26 of the SCSI connectors 12 and 13. This terminating power acts through current driver 25 to turn on all of the diodes 26 in the automatic terminator 20. When diodes 26 are conducting, the associated terminating resistors 27 are connected to the associated pins in the SCSI connectors. This connects the buffer terminating impedance to the connector. However, when a select pulse appears on pin 44 and is coupled to another device, the latch 23 is set thereby turning the current driver 25 off and disconnecting the terminating resistors 27 from their associated pins.

The latch 23 is reset by a pulse on the SCSI reset line which is connected to pins 40 on the SCSI connectors 12 and 13.

An LED 28 indicates when the automatic terminator 20 is turned on to connect terminating impedances to the connector.

The problem of misconnecting cables to an input connector when they should be connected to an output connector is depicted in FIG. 1. Note that the input connector of the middle device 11 has been erroneously connected to the input connector of the device which is next in the chain. Similarly, the output connector of the middle device has been erroneously connected to the output connector of the preceding device in the chain. This type of miscabling is common. In accordance with a further aspect of the present invention, a link detection circuit is connected to both connectors. The link detection circuit of the present invention automatically detects the presence of a connecting device and connects the proper terminating impedance in accordance with this detection. This makes the connectors of the device bi-directional. FIG. 5 depicts a network in which each device 11 has a link detect circuit 30. Because the link detect circuit of the present invention automatically detects whether another device is connected, the connectors of each device become bi-directional. Each connector can be used as an input connector or an output connector. Therefore, when the miscabling of FIG. 1 is present, there will be no adverse effect on network performance.

Figure 6:
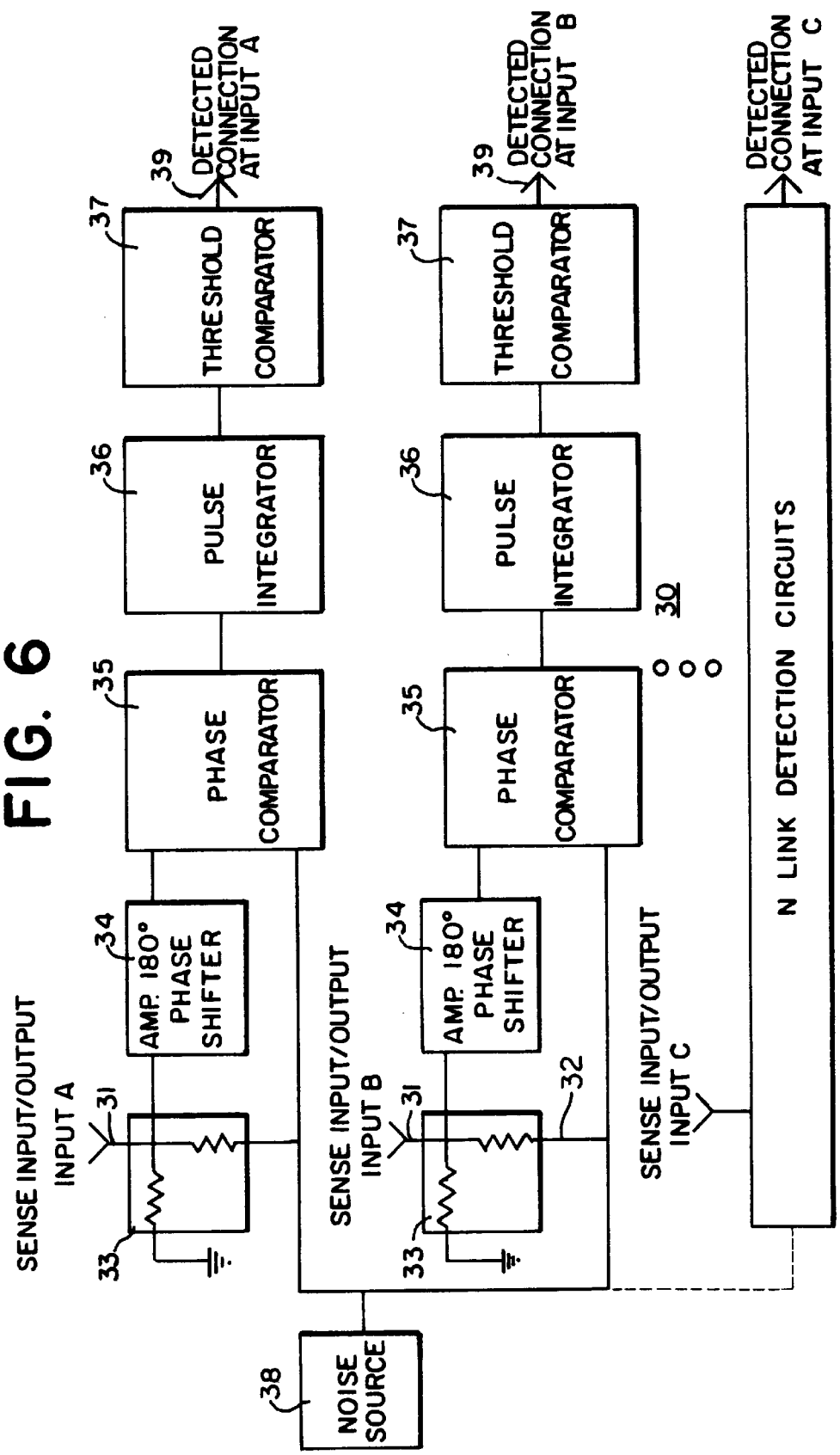
FIG. 6 is a block diagram of the N-link detection circuits.

FIG. 6 shows a block diagram of the link detect circuits 30. All of the link detect circuits 30 are alike. Each circuit uses a single line and a ground return for sensing, similar to the embodiment of FIG. 2. The noise source 38 is connected through signal output 32 to the sense input 31 and through isolation summing network 33. The sense input 31 senses an output from an adjoining circuit and the output 32 is used to signal adjoining inputs of its presence through its own input 31. An important aspect of the invention is keeping the sense input 31 from sensing its own output at 32. The input 31 and the output 32 are on the same line with the adjoining identical circuit.

When the connectors of a device in the middle of several daisy-chained devices are swapped, the sense input of one device is connected to the sense input of the adjoining device and the signal output is tied to the output. This defeats the sensing device's circuit operation. This is the same as inadvertent mis-plugging, typical in a user environment. The only way to solve this problem is to make a circuit that has both an output signal and an input sense tied to the same connector line. This requires that the sensing device not sense its own output signal. This is accomplished by the link detection circuit of the present invention as shown in FIG. 6.

Each link detection circuit includes an isolation/summing network 33 which is connected to the connector 31. A signal source, in this case a noise source 38, is connected to the isolation/summing network 33 and is connected to a phase comparator 35.

The isolation/summing network 33 produces a signal which is the sum of the output from noise source 38 and the signal on the connector 31. A phase shifter 34 shifts the phase of the summed signal by 180°. The output of amplifier 34 indicates the presence of another device connected to connector 31. The output of amplifier 34 is compared to the noise signal in phase comparator 35. The output of phase comparator 35 is integrated in integrator 36 and compared to a threshold in comparator 37. When the threshold is exceeded, an output is produced at 39, indicating the presence of another device connected to input connector 31.

The operation of the link detect circuit will be described with respect to the following three conditions at the input connector 31.

1. No connection (open circuit)
2. Connection of a like circuit or (other imbalancing signal.
3. Connection of ground.

1. No Connection (open circuit)

The signal out of the noise source 38 is directly connected to the phase comparator 35 and is used as a reference signal. This noise is also connected to the isolation/summing network 33. This accomplishes three things: It gives isolation to the noise source, reduces the amplitude by 10 to 1 (about 0.25 volts peak to peak) and it also sums its noise with the noise from the adjoining device's noise source (not connected in this state). This low level signal allows it to be placed on an existing signal ground that has been lifted from ground and bypassed for higher frequencies. This signal is then shifted 180° by the amplifier 180 degree phase shifter 34. It is then connected to the other input of the phase comparator 35. The comparator 37 has little or no output because of the cancellation between the 180° out of phase signal and the noise reference. The pulse integrator 36 will only integrate up to a small amount. This integrated output is then connected to the fixed threshold comparator 37. This small signal will not cross the threshold. The result is no detection of an adjoining device giving no output out of comparator 37 at 39.

2. Connection of a like Circuit or Imbalancing Signal

The signal out of the noise source 38 is still used as a reference signal to the phase comparator 35. This noise is also summed with the noise of the adjoining noise source in isolation/summing network 35. This summed signal is fed into the 180 degree phase shifter 34 and then into the phase comparator 35. This results in the cancellation of its own output signal, but leaves the signal from the adjoining device's noise source as an output. This causes the pulse integrator 36 to integrate up to the RMS amplitude of the adjoining noise source. With the threshold of the threshold comparator 37 properly set, the connection of the adjoining device is thus detected, giving an output at 39.

3. Connection of Ground

With the connection of a grounded adjacent device, the difference of the circuit operation is this: The input to the 180 degree phase shifter 34 is grounded leaving only the reference input to the phase comparator 35. No cancellation of the reference is accomplished. This leaves only the reference signal at the output of the phase comparator 35. This causes the pulse integrator 36 to integrate up and thus produces a detection at the output of the threshold comparator 37. This ground detection is useful for the detection of prior built equipment. This requires that the new sense circuit un-ground an extra ground which was previously grounded in the older equipment, and uses it as the sense line. When the new sense circuit is connected to the older equipment the sense line will be grounded, enabling the old equipment to be detected. If this is done, the sense input line should be bypassed for higher frequencies above the noise source frequency.

The link detection circuit is not limited for use by single ended or double ended systems. It could be implemented on ring or multiple stub systems, or any system requiring the detection of adjoining equipment.

A common noise source 38 can be used to drive many detection circuits within one piece of equipment, provided that it is able to drive the load impedance. It is also important that the impedance of the ISOLATION/SUMMING NETWORK 33 be nearly the same impedance for all devices using this detection.

FIGS. 7A–7B show a circuit diagram of an analog embodiment of the link detector circuit. The zener diode 40 is the thermal noise generator in the noise source 38. The noise is put onto pin 20 (line 31) of connector 12 and onto pin 20 (line 31) of connector 13. The noise is connected by line 32 through the isolation summing network 33, to the lines 31. This transmits noise to adjacent circuits to signal the connection of the device. Pin 20 of each connector is connected to the isolation/summing network 31. The operation of the circuit is as described with reference to FIG. 6. An automatic terminator 20 responds to the top link detector circuit to automatically terminate connector 13 and the bottom link detection circuit controls automatic terminator 20a to automatically terminate the connector 12.

The link detection circuit can also be implemented with digital circuits. If any two digital noise sources become exactly in sync, the detection will be defeated, because the net current between the two devices will be zero. Although this is highly unlikely, if the pseudo-random codes are long enough, and they start up at different times, synchronization will not occur. This is the reason thermal noise is used in the analog version, instead of oscillators that could sync up in phase.

While a preferred embodiment of the invention has been described and illustrated, it is to be understood that other modifications thereof may be made within the scope of the appended claims without departing from the spirit of the invention.

What is claimed is:

1. A detection circuit for automatically determining whether cable impedance termination is required, said detection circuit being in a device to be interconnected with other devices in a SCSI network, said device having a first connector to which a SCSI cable from another device may be connected and a second connector from which a SCSI cable to another device may be connected, each SCSI cable having assigned signal lines, at least one signal line carrying a pulse of current when said network becomes active, comprising:

a sense circuit connected to said one signal line for detecting a current pulse on a signal line passing between the first and second connectors; and a switchable terminator which is responsive to said sense circuit to automatically connect terminating impedance to the SCSI cable when no pulse is detected and to disconnect said terminating impedance from the SCSI cable when said pulse of current is detected without adding signal lines to, or modifying functionality of the SCSI cable.

2. The circuit recited in claim 1 further comprising:

a latch;

an inductive coupling between said SCSI control line and said latch, said inductive coupling being connected to set said latch when a pulse of current passes through said control line, the output of said latch being connected to said terminator to automatically disconnect said impedance when said latch is set and to connect said impedance when said latch is reset.

3. The circuit recited in claim 1 wherein said sense circuit is a link detection circuit connected to each of said connectors to detect whether another device is connected to each connector without adding extra signal lines or disturbing buss functionality, and a switchable terminator for each of said connectors, each switchable terminator being responsive to a link detect circuit to automatically connect terminating impedance to said connector when no other device is detected at said connector and to disconnect said impedance when another device is detected at said connector.

4. A detection circuit for automatically determining whether cable impedance termination is required, said detection circuit being in a device to be interconnected with other devices in a SCSI network, said device having a first connector to which a SCSI cable from another device maybe connected and a second connector from which a SCSI cable from another device may be connected, each SCSI cable having assigned signal lines and at least one reference voltage line, comprising:

a sense circuit for detecting whether another device is connected to at least one of said connectors, said sense circuit being connected to at least one reference voltage line in said cable, said sense circuit detecting the presence of a reference voltage connection from another device; and a switchable terminator which is responsive to said sense circuit to automatically connect terminating impedance to the cable when no reference voltage is detected and to disconnect said impedance when reference voltage is detected;

said switchable terminator being responsive to the detection of reference voltage from another device to disconnect said impedance without adding signal lines to, or modifying functionality of the SCSI cable.

5. The circuit recited in claim 4 wherein said reference voltage to which said sense circuit is connected is interrupted by a capacitor which passes AC currents between said device and other devices, said sense circuit being connected to said capacitor on the side which is connected to said other devices on said second connector, said sense circuit not requiring additional signal lines added to the SCSI cable and not disturbing cable functionality, said sense circuit further comprising:

a comparator, a resistor connecting a sense voltage to said comparator said comparator actuating said terminator to automatically connect said impedance to the SCSI cable when said sense voltage is present at the input of said comparator, said comparator disconnecting said impedance from the SCSI cable when reference voltage is present at the input of said comparator.

6. The circuit recited in claim 4 wherein said first connector is an input connector to which a cable to another device may be connected, said sense circuit being connected to at least one of said connectors.

7. The circuit recited in claim 4 wherein said sense circuit is a link detection circuit connected to each of said connectors to detect whether another device is connected to each connector without adding extra signal lines or disturbing buss functionality, and a switchable terminator for each of said connectors, each switchable terminator being responsive to a link detect circuit to automatically connect terminating impedance to said connector when no other device is detected at said connector and to disconnect said impedance when another device is detected at said connector.

8. The circuit recited in claim 7 wherein said link detect circuit comprises:

an isolation/summing network connected to one of said first and second connectors;

a signal source;

a phase comparator, the output of said signal source being applied to said phase comparator and to said isolation/summing network;

said isolation summing network producing a signal which is the sum of said signal source and the signal on said line in said connector;

a phase shifter, the output of said isolation/summing network being applied to said phase shifter;

the output of said phase shifter being applied to said phase comparator;

the output of said phase comparator indicating the presence of another device connected to said connector, the output of said phase comparator being applied to actuate said terminator.

9. The circuit recited in claim 8 wherein said link detect circuit further comprises:

a pulse integrator, the output of said phase comparator being connected to said pulse integrator;

a threshold comparator, the output of said pulse integrator being connected to said threshold comparator, said threshold comparator producing an output indicating a detected connection.

10. The circuit recited in claim 8 wherein said signal source is a noise source.

11. A detection circuit for automatically terminating a connector in a device to be interconnected with other devices in a network having a connector to which a cable from another device may be connected and another connector from which a cable to another device may be connected comprising:

a sense circuit for detecting whether another device is connected to said connector, said sense circuit being connected to at least one of said connectors; and a switchable terminator which is responsive to said sense circuit to automatically connect terminating impedance to said connector when no other device is detected and to disconnect said impedance when another device is detected.

12. A detection circuit for automatically terminating a connection in a device to be interconnected with other devices in a network having a connection to which another device may be connected and another connection to which another device may be connected comprising:

means attached to said connection and said another connection for detecting whether a device is connected to at least one of said connection and said another connection;

means for automatically disconnecting a terminating impedance when said means for detecting detects another device is attached to at least one of said connection and another connection, and for automatically connecting a terminating impedance when said means for detecting detects another device is not attached to at least one of said connection or said another connection.

\* \* \* \* \*